United States Patent

[11] 3,597,848

| [72] | Inventor | Paul E. Matson |
| | | East Syracuse, N.Y. |
| [21] | Appl. No. | 827,222 |
| [22] | Filed | May 23, 1969 |
| [45] | Patented | Aug. 10, 1971 |
| [73] | Assignee | Carrier Corporation |
| | | Syracuse, N.Y. |

[54] WELD GAUGE
2 Claims, 2 Drawing Figs.

[52] U.S. Cl. .................................................. 33/169 D, 33/149 B
[51] Int. Cl. ................................................... G01b 5/02
[50] Field of Search .......................................... 33/169 D, 149 B

[56] References Cited
FOREIGN PATENTS
1,033,914  10/1958  Germany ..................... 33/169

68,436  10/1944  Norway ........................ 33/169
203,464  3/1939  Switzerland .................. 33/169
198,685  8/1967  U.S.S.R ........................ 33/169

*Primary Examiner*—Leonard Forman
*Assistant Examiner*—Gary G. Kuehl
*Attorneys*—Harry G. Martin, Jr. and J. Raymond Curtin ABSTRACT: A gauge for measuring the length of each leg and the thickness of the throat of a fillet weld. The gauge comprises three rotatable sections arranged in superimposed relation. One of the sections is positioned to engage the end of one of the legs forming the fillet weld. A second section of the gauge is positioned to engage the end of the remaining leg of the fillet weld. The third section of the gauge is positioned to contact the face of the throat. Associated with the three sections of the gauge is a scale. The three sections of the gauge age positioned on the scale so the lengths of the legs and the thickness of the throat portion of the weld may be obtained.

Patented Aug. 10, 1971

3,597,848

INVENTOR.
PAUL E. MATSON.
BY
ATTORNEY.

WELD GAUGE

BACKGROUND OF THE INVENTION

This invention relates to measuring devices for determining the dimensions of a fillet weld and in particular, to a new and improved gauge, whereby the lengths of the two legs comprising the fillet weld and the thickness of the throat portion thereof may be obtained.

Fillet welds are used when it is desired to join together two surfaces angularly displaced relative to each other. The fillet weld comprises two legs; one of the legs is formed on one of the surfaces being joined and the second leg is formed on the remaining surface. The two legs meet at the junction of the two surfaces being joined, thereby forming the root of the weld. The minimum distance from the root of the weld to the face of the weld is known as the throat.

The length of the two legs and the thickness of the throat are important measurements, since they determine the cross-sectional area of the weld, from which the strength of the weld may be computed.

Heretofore many of the gauges used to determine the dimensions of the weld have not been accurate. These gauges have been constructed assuming the fillet weld being measured will be an isosceles triangle, the legs of the weld being equivalent to the legs of the triangle and the face of the weld being equivalent to the base of the triangle. This assumption has been wrong for most welds, since in most cases, the legs are not equal in size and the face of the weld is not straight, but is either concave or convex, hence the inaccuracies.

Furthermore, most of the guages were too bulky to use where there was only limited access to the weld. Additionally, most if not all of the gauges required the surfaces being joined be flat and perpendicular relative to each other.

Most of the gauges heretofore used in the art could not be utilized to measure all three of the dimensions hereinbefore noted. Those that did provide means for obtaining all three dimensions generally were extremely costly to manufacture, since they used a micrometer mechanism, or its like. Additionally, the disadvantages previously noted would apply to these gauges also.

SUMMARY OF THE INVENTION

This invention relates to a novel weld gauge, one that will be relatively inexpensive to manufacture, will afford reliable measurements, and will have none of the disadvantages heretofore discussed.

The novel gauge comprises three elongated members, rotatable relative to each other. Additionally, a fourth member mounting a scale thereon may be included as part of the gauge per se, or alternatively, may be kept completely separate from the gauge structure.

When a fillet weld is to be measured, one of the members will be rotated so the extremity thereof will engage one of the legs at the end opposite the root of the weld. A second member will be rotated so the extremity thereof will engage the second leg at its end opposite the root of the weld. The third member will be rotated to contact the face of the weld at its median point. The members will then be fixed in place to prevent any movement.

The three members will then be positioned on the scale so the weld measurements may be obtained.

The scale comprises three sets of numbers. One set will be associated with a plurality of graduated, horizontal spaces. A second set will be associated with a plurality of graduated, vertical spaces; and the third set will be associated with a plurality of graduated, diagonal spaces. The horizontal and vertical graduations will be used in determining the length of the legs of the weld, and the diagonal spaces will be used in determining the thickness of the throat. The members of the gauge will be positioned on the scale so the appropriate dimension may be obtained.

Preferably, the extremities of the members engaging the weld will be tapered to permit access to welds in relatively enclosed areas.

Since the members of the gauge are all rotatable relative to each other, there is no requirement that the surfaces being joined be perpendicular to each other. Also, the surfaces being joined do not have to be flat, since the tapered extremities of the members are designed to accommodate irregular surfaces.

The novel gauge herein disclosed is relatively inexpensive to manufacture; no micrometer mechanism, or its like, is utilized.

The gauge herein disclosed will afford an accurate means for determining the dimensions of a fillet weld, one that is relatively inexpensive to manufacture and easy to use.

DESCRIPTION OF THE PREFERRED EMBODIMENT

Figure 1:
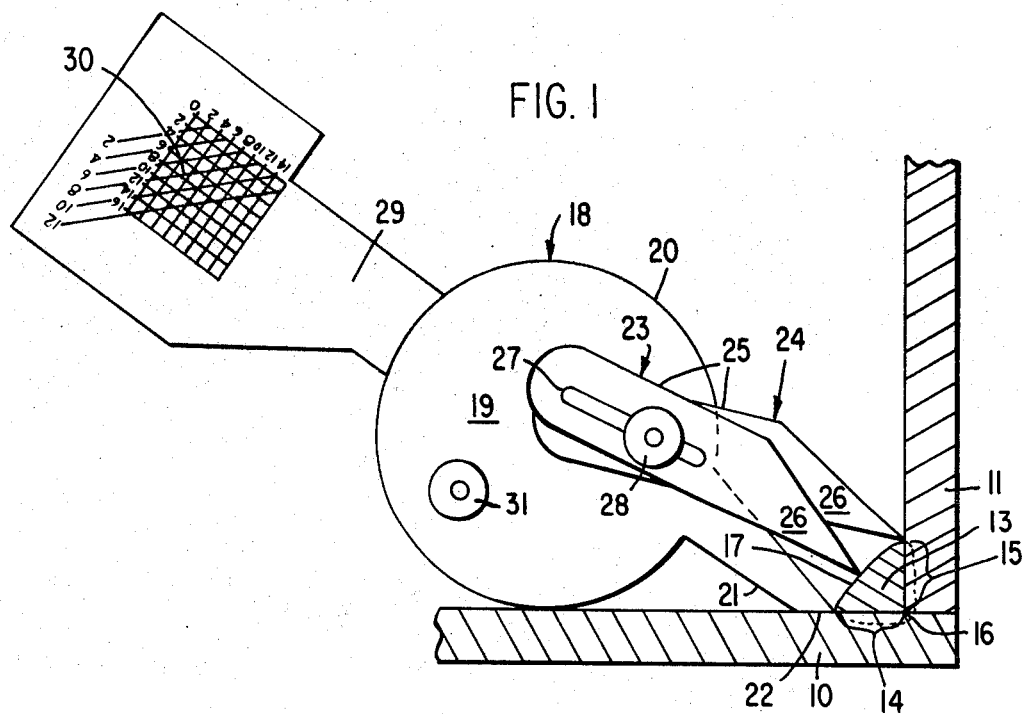
FIG. 1 of the drawings is a section through a typical fillet weld, with the novel gauge being used to measure the weld.

Referring now to the drawings, there is depicted the novel gauge being used to measure a typical fillet weld. In referring to the drawings, like numerals shall refer to like parts.

FIG. 1 of the drawings shows two pieces of material 10 and 11 being joined together by fillet weld 13. The fillet weld 13 comprises two legs 14 and 15, one of the legs being formed on one of the pieces of material being joined and the second leg being formed on the remaining piece of material. The two legs meet at the junction of the two pieces being joined, thereby forming the root or apex 16 of the weld. The minimum distance from the root 16 of the weld 13 to the face 17 of the weld 13 is known as the throat. It is important to accurately determine the length of each of the legs and the thickness of the throat to meet specification requirements and to determine the strength of the weld.

Heretofore, the gauges used in the art to obtain the dimensions noted hereinabove, have not proven accurate for the reasons discussed heretofore. Additionally, if the pieces of material 10 and 11 were not perpendicular to each other, many of these gauges could not be used. The novel gauge 18, to be more fully described hereinafter, alleviates the problems heretofore encountered.

The gauge 18 comprises a central member 19. The member 19 includes a main, substantially circular portion 20 and an elongated, tapered portion 21 preferably formed integral therewith. In a preferred embodiment, the extremity of portion 21 defines a substantially flat surface 22 for a reason to be more fully described hereinafter. However, it is within the scope of the invention for the extremity of portion 21 to define a point.

Mounted on the member 19, to rotate relative thereto, are members 23 and 24. The members 23 and 24 are similar in shape to facilitate the manufacturing of the gauge. Each of the members comprise a substantially rectangular portion 25. Extending therefrom is a tapered portion 26, the extremity thereof defining a point.

Each of the members 23 and 24 has an elongated opening 27 in the rectangular portion 25. A thumbscrew 28, or similar device, extends through the opening 27 and maintains the members 23 and 24 in their axial position on member 19. The elongated opening 27 permits the members 23 and 24 to be moved radially relative to the member 19, thus permitting the tapered portions 26 to extend further from the circular portion 20 of member 19, or to be positioned closer to the circular portion 20, as conditions require.

In a preferred embodiment, the gauge includes a fourth member 29 mounting a scale 30 thereon. However, it is within the scope of this invention for the scale to be completely separate from the gauge.

Figure 2:
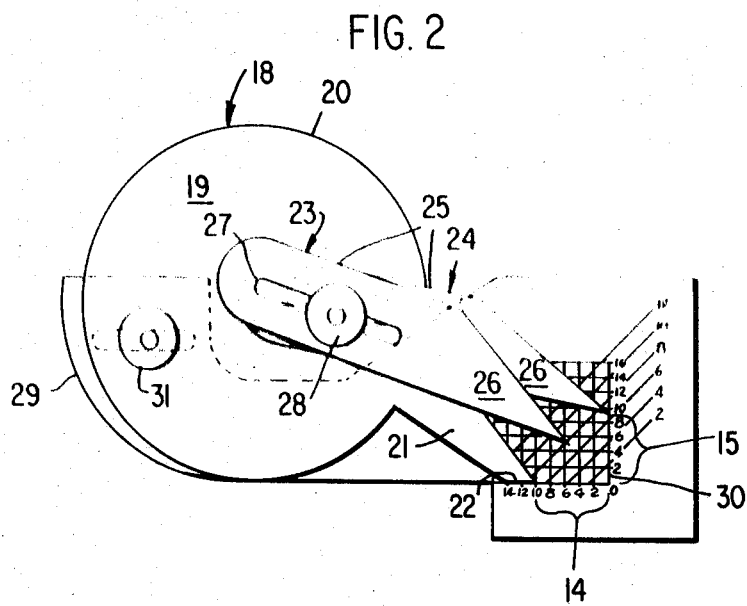
FIG. 2 is a view of the novel gauge being positioned on its associated scale, the dimensions of the weld being thus obtained.

The scale 30 comprises three sets of numbers, a vertical set, a horizontal set, and a diagonal set. The numbers correspond to a plurality of graduated spaces formed by a plurality of vertical, horizontal, and diagonal lines. In a preferred embodiment, the spaces are separated by one-eighth inch; each number therefore represents two-sixteenths inch. Thus, the scale may be read accurately to one-sixteenth inch. However, the spacings may be altered to permit the scale to be used for determining finer readings, such as one thirty-second inch. The scale can be inscribed directly onto the material forming member 29, or the scale may be laminated thereon. When the scale is connected integrally to the gauge, the member 29 mounting the scale is rotatable relative to the other members comprising the gauge. Thumbscrew 31, or a similar device, maintains the member 29 as an integral part of the gauge 18. The portion of member 29 underlying the members 19, 23, and 24 is shown in dotted lines in FIG. 2.

To measure the weld 13, the extremity of elongated portion 21 is aligned with the end of one of the legs of the weld. The flat surface 22 is placed flush with the surface of the piece being joined. The flat surface 22 thus firmly positions the point of portion 21 against the end of the leg 14 being measured.

One of the members 23 and 24, as shown member 24, is positioned so the pointed extremity of portion 26 is aligned with the end of the second weld leg 15.

Member 23 is then positioned so the pointed extremity of portion 26 contacts the face 17 of the weld 13 at its midpoint. Thumbscrew 28 is then tightened to hold the members 19, 23, and 24 in position.

The gauge is then withdrawn from the two pieces being joined. The members 19, 23, and 24 are then positioned on the scale 30. This is accomplished in the preferred embodiment by rotating member 29 so the flat surface 22 of member 19 lies directly on the bottom horizontal axis of the scale 30. Member 24 will thereby be positioned so the pointed extremity will contact the vertical axis of the scale. The pointed extremity of member 23 will be aligned with the diagonally extending lines of the scale. As shown, leg 14 measures ten-sixteenths inch, leg 15 measures nine-sixteenths inch, and the throat is seven-sixteenths inch.

Utilization of the novel weld gauge disclosed herein will enable those skilled in the art to accurately determine the true cross-sectional area of a weld and to thereby compute the structural strength of the weld.

While I have described and illustrated a preferred embodiment of my invention, it will be understood that my invention is not limited thereto, since it may be otherwise embodied within the scope of the following claims.

I claim:

1. A gauge for measuring the cross-sectional area of a weldment securing two structural members, said weldment including two legs and a minimum thickness representing the throat of the weldment, said gauge comprising:
    A. first means operable to engage at least a part of one of said legs of said fillet weld;
    B. second means operable to engage at least a part of the remaining leg of said fillet weld;
    C. third means operable to engage at least a part of said throat of said fillet weld; and
    D. scale means connected to said gauge and rotatable relative thereto so said first, second and third means may be positioned thereon, the magnitude of the dimensions of said fillet weld being thus obtainable.

2. A gauge for measuring the cross-sectional area of a weldment securing two structural members, said weldment including two legs and a minimum thickness representing the throat of the weldment, said gauge comprising:
    A. a first movable member, alignable with at least one portion of one of said legs of said fillet weld, the extremity of said first member being in contact with said portion of said leg;
    B. a second movable member, alignable with at least one portion of the remaining leg of said fillet weld, the extremity of said second member being in contact with said portion of said leg;
    C. a third movable member, alignable with at least a portion of said throat of said fillet weld, the extremity of said third member being in contact with said portion of said throat; and
    D. scale means having established on at least one surface thereof, a plurality of graduated and numbered spaces, said scale means being connected to said gauge and movable relative to said first, second and third members, so said extremities of said members may be positioned thereon, the magnitude of the dimensions of said fillet weld being thus obtainable.